(12) United States Patent
Muske et al.

(10) Patent No.: US 11,699,359 B2
(45) Date of Patent: Jul. 11, 2023

(54) WELD TRAINING SYSTEMS WITH RESETTABLE TARGET TOOL IMAGES

(71) Applicant: ILLINOIS TOOL WORKS INC., Glenview, IL (US)

(72) Inventors: Mitchell James Muske, Neenah, WI (US); Joseph C. Schneider, Greenville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/460,862

(22) Filed: Aug. 30, 2021

(65) Prior Publication Data
US 2023/0066872 A1 Mar. 2, 2023

(51) Int. Cl.
G09B 19/24 (2006.01)
G09B 9/00 (2006.01)
G06F 3/14 (2006.01)

(52) U.S. Cl.
CPC .............. *G09B 19/24* (2013.01); *G06F 3/14* (2013.01); *G09B 9/00* (2013.01)

(58) Field of Classification Search
CPC . G09B 19/24; G09B 9/00; B23K 9/09; B23K 9/095; B23K 9/0953
See application file for complete search history.

(56) References Cited

U.S. PATENT DOCUMENTS

| | | | | |
|---|---|---|---|---|
| 10,448,692 | B2 * | 10/2019 | Hsu | G06T 3/40 |
| 2009/0298024 | A1 * | 12/2009 | Batzler | G09B 5/00 |
| | | | | 434/234 |
| 2013/0182070 | A1 * | 7/2013 | Peters | G06T 19/006 |
| | | | | 348/43 |
| 2016/0267806 | A1 * | 9/2016 | Hsu | G09B 19/00 |
| 2017/0200395 | A1 * | 7/2017 | Albrecht | G09B 5/02 |
| 2020/0254572 | A1 | 8/2020 | Becker et al. | |
| 2020/0262009 | A1 * | 8/2020 | Becker | G06T 7/292 |
| 2021/0158724 | A1 | 5/2021 | Becker et al. | |

OTHER PUBLICATIONS

Wikipedia, Ghost (Super Mario Kart Series), https://www.mariowiki.com/Ghost_(Mario_Kart_series), Aug. 16, 2021, 3 pages.
European Patent Office, Search Report, application No. 22188231.9-1218, dated Jan. 24, 2023, 9 pages.

* cited by examiner

*Primary Examiner* — Robert J Utama
(74) *Attorney, Agent, or Firm* — McAndrews, Held & Malloy, Ltd.

(57) ABSTRACT

Described herein are examples of weld training systems that show (e.g., transparent and/or translucent) "ghost" images of a welding tool on a display screen of a welding headgear to indicate target positions and/or target orientations of an actual welding tool. In some examples, the weld training systems may additionally "reset" the target tool image to a position closer to the actual welding tool if the target tool image gets too far away. The ability to "reset" the target tool image to a position closer to the actual welding tool may help in minimizing a risk that an operator 106 will overcompensate to try to catch up with the target tool image, which can be detrimental to the weld. Additionally, resetting the target tool image to a position closer the welding tool may allow an operator to better perceive and/or understand differences in orientation and/or other technique parameters.

20 Claims, 9 Drawing Sheets

WELD TRAINING SYSTEMS WITH RESETTABLE TARGET TOOL IMAGES

TECHNICAL FIELD

The present disclosure generally relates to weld training systems and, more particularly, to weld training systems with resettable target tool images.

BACKGROUND

The welding industry has a shortage of experienced and skilled operators available for welding jobs. Additionally, conventional training of new operators requires live instruction from experienced operators, making the shortage of experienced operators available for welding jobs even greater. As a result, training systems that simulate live instructional training have been developed in order to help train new operators without requiring live instruction from experienced operators.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to weld training systems with resettable target tool images, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Figure 1:
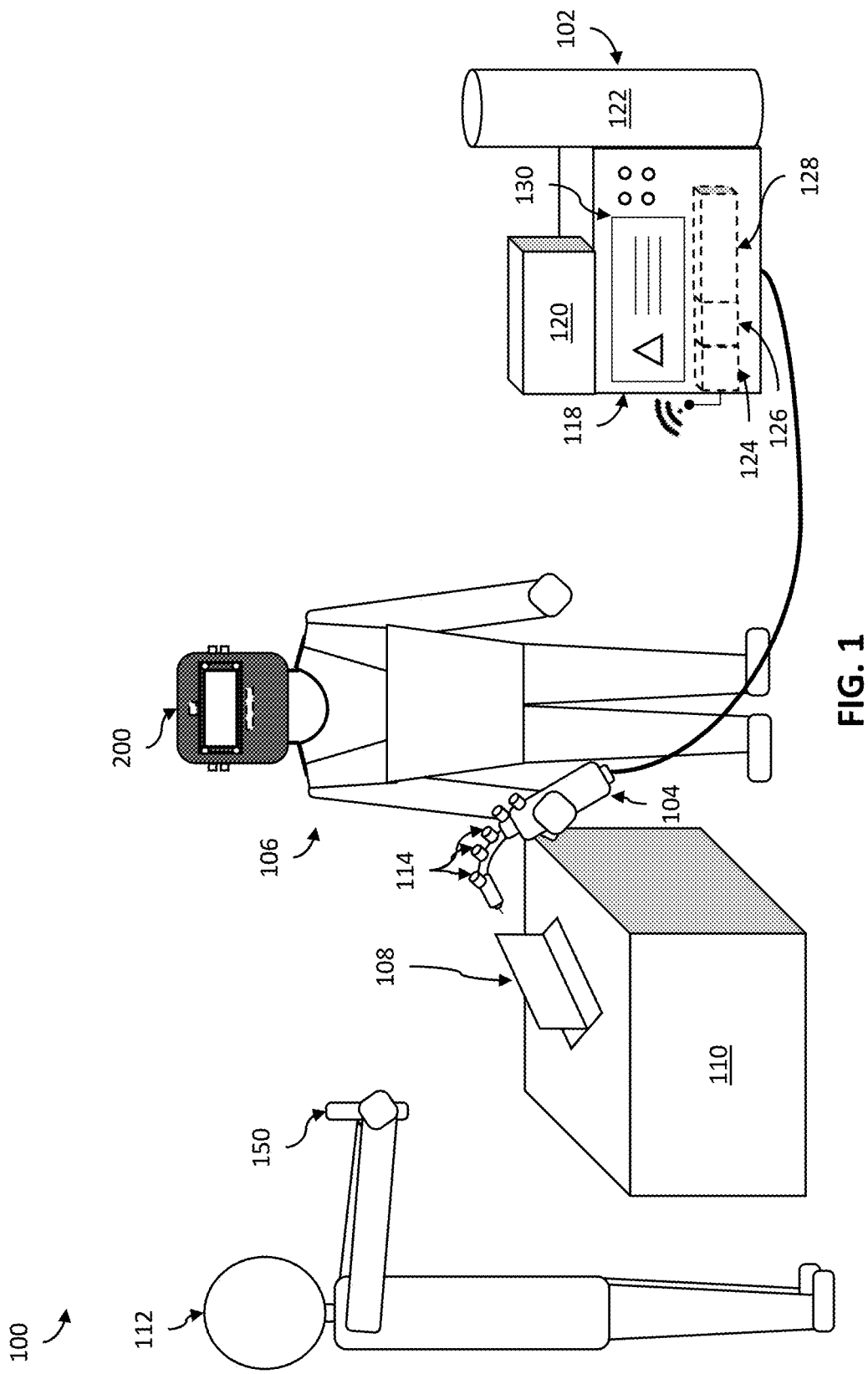
FIG. 1 shows an example of a weld training system, in accordance with aspects of this disclosure.

Some examples of the present disclosure relate to weld training systems that show (e.g., transparent and/or translucent) "ghost" images of a welding tool (e.g., torch) on a display screen of a welding headgear to help guide a trainee through a welding operation. In some examples, the "ghost" images of the welding tool may indicate target positions and/or orientations for the actual welding tool being used by the trainee. As the "ghost" images indicate target positions/orientations of the welding tool, the images are referred to herein as target tool images.

In some examples, the target tool images may serve as a guide to help new welding operators understand proper welding technique (e.g., travel speed, contact tip to work distance, work angle, travel angle, aim, etc.) for a particular welding operation. In some examples, the target tool images may be shown on a display screen of a welding helmet and/or other headgear. By displaying the target tool image on a display screen of the helmet/headgear, a user wearing the helmet/headgear will be able to easily see the target tool image in relation to the actual welding tool, without having to look away from the welding operation.

In some examples, the weld training systems may additionally "reset" (or provide an option to reset) the target tool image to an earlier and/or prior position if the target tool image gets too far from the welding tool. This may help in situations where the travel speed of the target tool image substantially outpaces the travel speed of the actual welding tool (or vice versa). In such situations, the relative orientations of the target tool image and actual welding tool may be difficult to compare due to their distance, making the target tool image less helpful as a training guide. Additionally, resetting the target tool image to a position closer to the welding tool may minimize the possibility that the trainee will be tempted to overcompensate their travel speed (up or down) in order to catch up with the target tool image; a practice which may be highly detrimental to the quality of the weld.

Some examples of the present disclosure relate to a non-transitory machine readable medium comprising machine readable instructions which, when executed by a processor, cause the processor to: determine a first target position and a first target orientation for a target tool image based on one or more target welding technique parameters; identify an actual position and an actual orientation of a welding tool based on sensor data received from a sensor of a welding headgear; compare the actual position of the welding tool with the first target position of the target tool image; and in response to determining the first target position of the target tool image is more than a threshold distance from the actual position of the welding tool: reset, or provide an option to reset, the first target position of the target tool image to a second target position that is closer to the actual position of the welding tool.

In some examples, the non-transitory machine readable medium further comprises machine readable instructions which, when executed by a processor, cause the processor to display the target tool image on a display screen of the welding headgear based on the first target position or the second target position. In some examples, the non-transitory machine readable medium further comprises machine readable instructions which, when executed by a processor, cause the processor to display a movement of the target tool image on the display screen at a travel speed that corresponds to an actual travel speed of the welding tool. In some examples, the non-transitory machine readable medium further comprises machine readable instructions which, when executed by a processor, cause the processor to negatively adjust a welding score in response to the first target position being reset.

In some examples, the welding score is determined based on a difference between the first target orientation of the target tool image and the actual orientation of the welding tool, as well as a number of times the first target position of the target tool image was reset. In some examples, the one or more target welding technique parameters were recorded during a previous welding operation. In some examples, the second target position of the target tool image corresponds to a position that was recorded during the previous welding operation.

Some examples of the present disclosure relate to a welding headgear, comprising: a display screen; a sensor configured to detect sensor data relating to a welding tool; and processing circuitry configured to: determine a first target position and a first target orientation for a target tool image based on one or more target welding technique parameters, identify an actual position and an actual orientation of the welding tool based on the sensor data, compare the actual position of the welding tool with the first target position of the target tool image, and in response to determining the first target position of the target tool image is more than a threshold distance from the actual position of the welding tool: reset, or provide an option to reset, the first target position of the target tool image to a second target position that is closer to the actual position of the welding tool.

In some examples, the processing circuitry is further configured to: identify an activation time of the welding tool or a length of a weld bead, determine the first target position and first target orientation for the target tool image based on the one or more target welding technique parameters as well as: the activation time of the welding tool, or the length of the weld bead. In some examples, the one or more target welding technique parameters were recorded during a previous welding operation, and the second target position of the target tool image corresponds to a position of a previous welding tool that was recorded during the previous welding operation when a previous weld bead was of a same length as the length of the weld bead. In some examples the welding headgear further comprises a helmet shell, the display screen, sensor, and processing circuitry being retained by the helmet shell.

In some examples, the one or more target welding technique parameters comprise one or more of a torch position, torch orientation, torch travel speed, torch travel direction, torch travel angle, work angle, contact tip to work distance, torch aim, or weld path characteristic, and the sensor comprises a camera sensor, optical sensor, infra-red (IR) sensor, thermal sensor, acoustic sensor, ultrasonic sensor, or electromagnetic sensor. In some examples, the target tool image comprises an outline, transparent depiction, translucent depiction, or semi-transparent depiction of the welding tool, a different welding tool, or a welding consumable. In some examples, the processing circuitry is further configured to: compare the actual position and actual orientation of the welding tool with the first target position and first target orientation of the target tool image, and in response to determining the actual position and actual orientation of the welding tool match the first target position and first target orientation of the target tool image, providing an effect that affirms that the welding tool is properly positioned and oriented.

Some examples of the present disclosure relate to a method of guiding a welding operator, comprising: determining, via processing circuitry of a welding headgear, a first target position and a first target orientation for a target tool image based on one or more target welding technique parameters; identifying an actual position and an actual orientation of a welding tool based on sensor data received from a sensor of the welding headgear; comparing the actual position of the welding tool with the first target position of the target tool image; and in response to determining the first target position of the target tool image is more than a threshold distance from the actual position of the welding tool: resetting, or providing an option to reset, the first target position of the target tool image to a second target position that is closer to the actual position of the welding tool.

In some examples, the method further comprises displaying the target tool image on a display screen of the welding headgear based on the first target position or second target position. In some examples, the method further comprises negatively adjusting a welding score in response to the first target tool position being reset, and displaying the welding score on the display screen. In some examples, the method further comprises displaying a movement of the target tool image on the display screen at a travel speed that corresponds to an actual travel speed of the welding tool.

In some examples, the one or more target welding technique parameters comprise one or more of a torch position, torch orientation, torch travel speed, torch travel direction, torch travel angle, work angle, contact tip to work distance, torch aim, or weld path characteristic, the sensor comprises a camera sensor, optical sensor, infra-red (IR) sensor, thermal sensor, acoustic sensor, ultrasonic sensor, or electromagnetic sensor, and the target tool image comprises an outline, transparent depiction, translucent depiction, or semi-transparent depiction of the welding tool, a different welding tool, or a welding consumable. In some examples, the method further comprises comparing the actual position and actual orientation of the welding tool with the first target position and first target orientation of the target tool image; and in response to determining the actual position and actual orientation of the welding tool match the first target position and first target orientation of the target tool image, providing an effect, via a user interface of the welding headgear, that affirms that the welding tool is properly positioned and oriented.

FIG. 1a shows an example of a weld training system 100. As shown, the weld training system 100 includes welding-type equipment 102 connected (e.g., electrically) with a welding-type tool 104. In the example of FIG. 1, an operator 106 wearing a welding helmet 200 is using the welding-type tool 104 to perform a welding-type operation on a workpiece 108 sitting on a welding bench 110. An observer 112 holding an observation device 150 is shown watching the operator 106 perform the welding-type operation.

While not shown in the example of FIG. 1 for the sake of simplicity, in some examples, the welding-type equipment 102 may also be (e.g., electrically) connected to the welding bench 110 and/or workpiece 108. Though only one observer 112 is shown in the example of FIG. 1 for the sake of simplicity, in some examples there may be several observers 112 with several different observation devices 150. While shown as a handheld mobile device (e.g., smartphone, tablet, etc.) in the example of FIG. 1, in some examples, the observation device 150 may instead be a welding helmet 200 or other device.

In some examples, the welding helmet 200 worn by the operator 106 in FIG. 1 may implement a weld training simulator configured to conduct a weld training simulation. In some examples, the welding helmet 200 may be configured to conduct a weld training simulation that is a virtual, augmented, or mixed reality weld training simulation. In some examples, the welding helmet 200 may conduct the weld training simulation by outputting simulation stimuli (e.g., visual effects, audio effects, haptic effects, and/or other sensory stimulations perceptible to the operator 106) while still allowing the operator 106 to perceive some or all of the real world. The stimuli output by the welding helmet 200 may overlap with (and/or augment) real world stimuli, resulting in an augmented, mixed, mediated, or simulated reality.

In some examples, the welding helmet 200 may simulate various stimuli that occur during live, real world, welding-type operations, such as, for example the sight, sound, and/or feel of a welding arc, a molten weld puddle, a weld bead, welding fumes, spatter, sparks, a welding-type tool, a workpiece material, and/or an auto-darkening filter (ADF). In this way, the welding helmet 200 can provide the operator 106 with a simulated version of a live welding-type operation. In some examples, the welding helmet 200 may instead be used during an actual live welding-type operation. Whether used during live, real world, welding-type operations, or simulated welding-type operations, the welding helmet 200 may provide various stimuli to help guide the operator 106 through the welding-type operation.

In some examples, the welding helmet 200 may provide stimuli in the form of real time feedback. For example, the welding helmet 200 may provide feedback to the operator 106 with respect to a welding technique of the operator 106, welding parameters set by the operator 106, and/or other aspects of the weld training system 100. In some examples, the feedback may help to guide a new and/or less experienced operator 106 in understanding how to perform the welding operation.

In order to conduct the weld training simulation convincingly, the welding helmet 200 may track the position and/or orientation of certain items. For example, the welding helmet 200 may track the position and/or orientation of the workpiece 108, the welding bench 110, the welding-type tool 104, and/or certain portions of the welding-type tool 104 (e.g., the nozzle, contact tip, etc.). In examples where live welding occurs, the welding helmet 200 may track the position and/or orientation of a welding arc. In some examples, the welding helmet 200 may track the position and/or orientation of itself, which may, in some situations, help the welding helmet 200 to distinguish between movement of the welding helmet 200 and movement of items tracked by the welding helmet 200. In some examples, the welding helmet 200 may track positions and/or orientations using helmet sensors 202, discussed further below with respect to FIGS. 2-3.

In some examples, markers 114 may assist the welding helmet 200 and/or weld training system 100 in tracking the position and/or orientation of the welding-type tool 104. For example, the markers 114 may be easily recognizable by the welding helmet 200 in (e.g., image) data captured by the helmet sensors 202, and thus assist in recognition of the welding-type tool 104. In some examples, the markers 114 may assist in identifying and/or recognizing particular portions of the welding-type tool 104.

For example, the markers 114 may define (and/or may be calibrated to define) a recognizable and/or unique geometric configuration (and/or rigid body). In some examples, this geometric configuration (and/or rigid body) can be correlated (e.g., in memory) with a known (e.g., stored in memory) structural configuration and/or model of the welding-type tool 104. Thus, by identifying and/or tracking the particular geometric configuration of markers 114, the weld training system 100 may be able to identify and/or track the structural configuration of the welding-type tool 104; including particular portions (e.g., nozzle, neck, handle, etc.) of the structural configuration.

In some examples, the welding-type tool 104 may include at least three markers 114 fixed to the welding-type tool 104 relative to one another in a single plane, and a fourth marker 114 fixed to the welding-type tool 104 in a different (e.g., adjacent) plane, to define a rigid body. While a certain number of markers 114 are shown in the example of FIG. 1 attached to the handle, neck, and nozzle of the welding-type tool 104 for the purposes of illustration, in some examples more or fewer markers 114 may be attached to the handle, neck, nozzle, and/or other portions of the welding-type tool 104.

In some examples, the welding-type tool 104 may include no markers 114. In such examples, the weld training system 100 may instead use object recognition, computer vision, and/or other image processing techniques to identify, recognize, and/or track the welding-type tool 104.

While depicted in FIG. 1 as a welding torch or gun configured for gas metal arc welding (GMAW), in some examples, the welding-type tool 104 may instead be a different welding-type tool 104. For example, the welding-type tool 104 may be an electrode holder (i.e., stinger) configured for shielded metal arc welding (SMAW), a torch and/or filler rod configured for gas tungsten arc welding (GTAW), a welding gun configured for flux-cored arc welding (FCAW), and/or a plasma cutter. In some examples, the welding-type tool 104 may be a mock welding-type tool, and/or be configured for mock (as opposed to live) welding-type operations.

In the example of FIG. 1, the welding-type tool 104 is connected to welding-type equipment 102. In examples where live welding-type operations are conducted, the welding-type equipment 102 may provide welding-type power and/or consumables to the welding-type tool 104, and/or information to the welding helmet 200. In some examples where live welding-type operations are conducted, the welding-type tool 104 may transmit one or more signals to the welding-type equipment 102 (and/or welding helmet 200 and/or observation device 150) when activated (e.g., via trigger pull, foot pedal press, etc.). In response to the activation signal(s), the welding-type equipment 102 may output welding-type power and/or consumables (e.g., wire and gas) to the welding-type tool 104.

In some examples where simulated welding-type operations are conducted, the welding-type tool 104 may still transmit one or more signals to the welding-type equipment 102 (and/or welding helmet 200 and/or observation device 150) when activated. However, the welding-type equipment 102 may just provide activation information to the welding helmet 200 (and/or observation device 150) in response to the activation signals, rather than outputting power or consumables. In some examples where simulated welding-type operations are conducted, the welding-type equipment 102 may comprise mock welding-type equipment and/or a computational system (e.g., desktop, laptop, etc.). In some examples where simulated welding-type operations are conducted, the welding-type equipment 102 may be omitted altogether.

In the example of FIG. 1, the welding-type equipment 106 comprises a welding-type power supply 118, wire feeder 120, and gas supply 122. In some live welding examples, the wire feeder 120 may be configured to feed wire to the welding-type tool 104. In some live welding examples, the gas supply 122 may be configured to route shielding gas to the welding-type tool 104.

In the example of FIG. 1, the power supply 118 includes power communication circuitry 124, power control circuitry 126, and power conversion circuitry 128 interconnected with one another. In some examples, the power conversion circuitry 128 may be configured to receive input power (e.g., from a generator, a battery, mains power, etc.) and convert the input power to welding-type output power, such as might be suitable for use by the welding-type tool 104 for welding-type operations. In some examples, the power control circuitry 126 may be configured to control operation of the communication circuitry 124, power conversion circuitry 128, wire feeder 120, and/or gas supply 122 (e.g. via one or more control signals) in accordance with one or more welding parameters.

In the example of FIG. 1, the welding-type equipment 102 further includes an operator interface 130. In some examples, the operator interface 130 may comprise one or more display screens, touch screens, knobs, buttons, levers, switches, microphones, speakers, lights, and/or other mechanisms through which an operator 106 may provide input to, and/or receive output from, the welding-type equipment. For example, an operator 106 may use the operator interface 130 to input one or more welding parameters (e.g., target voltage, current, wire feed speed, wire/filler type, wire/filler diameter, gas type, gas flow rate, welding-type process, material type of workpiece 108, position of welding-type process, joint position, joint type, joint geometry/thickness, etc.). As another example, the operator 106 may use the operator interface 130 to view and/or otherwise understand the current welding parameters of the welding-type equipment 102.

While shown as part of the power supply 118 in FIG. 1, in some examples, the operator interface 130, power control circuitry 126, and/or power communication circuitry 124 (and/or some other control/communication circuitry) may be part of the wire feeder 120 and/or gas supply 122. In some examples, the power communication circuitry 124 may be configured to facilitate communication with the welding-type tool 104, welding helmet 200, observation device 150, and/or welding helmet 200.

Figure 2B:
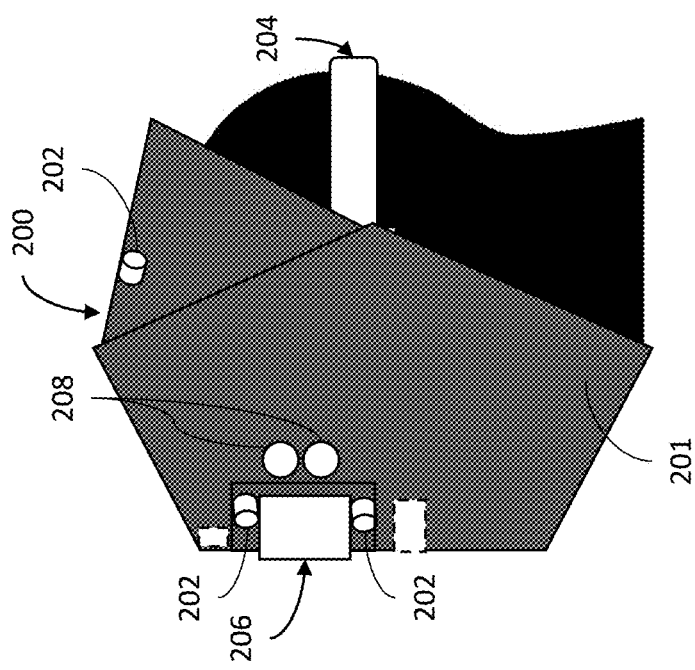
FIG. 2a-2b shows enlarged front and side views of a welding helmet of the weld training system of FIG. 1, in accordance with aspects of this disclosure.
Figure 2A:
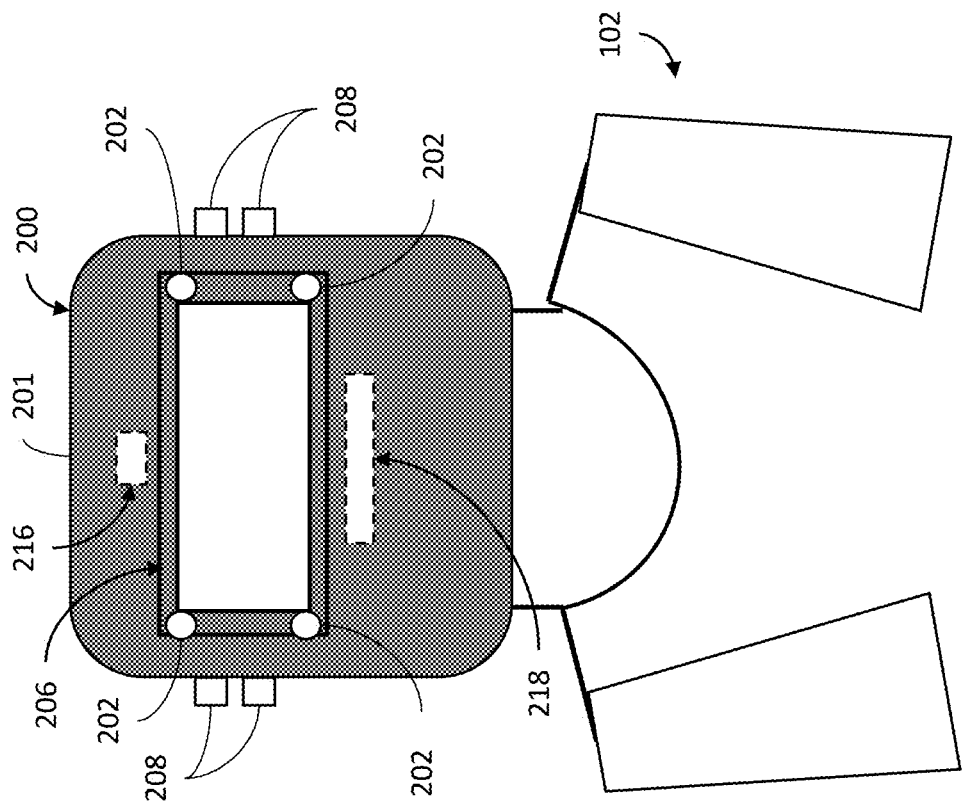

FIGS. 2a-2b show example enlarged front and side view of the welding helmet 200. While shown as a welding helmet 200 in the examples of FIGS. 2a-2b, in some examples, the welding helmet 200 may be a different sort of headgear. For example, the welding helmet 200 may instead be implemented via goggles, a non-welding helmet, a visor, and/or other appropriate wearables.

In the example of FIGS. 2a-2b, the welding helmet 200 comprises a helmet shell 201 attached to a suspension 204. As shown, the suspension 204 comprises several straps and/or bands configured to wrap around the head of an operator 106. The straps are connected to one another and to the helmet shell 201 at least at two side attachment points on either side of the head of the operator 106. In some examples, the helmet 200 may be configured to rotate and/or pivot about the side attachment points to transition between raised and lowered positions.

In the examples of FIGS. 2a-2b, the welding helmet 200 also includes a lens assembly 206 fixed to (and/or integrated into) a front portion of the helmet shell 201 at approximately eye level. In some examples, the lens assembly 206 may comprise a mobile device (e.g., smartphone, tablet, etc.). In some examples, the lens assembly 206 may include a cover lens, an auto-darkening filter (ADF), and/or one or more display screens 602 (see, e.g., FIGS. 6a-6d). In some examples, the cover lens may be (e.g., partially or fully) transparent and/or configured to allow an operator 106 to see through the cover lens and/or view the surrounding environment.

In some examples, the display screen(s) 602 of the lens assembly 206 may comprise one or more near-eye displays. In some examples, the display screen(s) 602 may be semi-transparent and/or configured to overlay information (e.g., virtual/simulated/holographic objects, guidance, technique feedback, technique parameters, welding parameters, messages, etc.) onto at least part of cover lens (and/or lens assembly 206). In some examples, the display screen(s) 602 may be integrated into safety glasses attached to (and/or in communication with) the welding helmet 200.

In some examples, a display screen(s) 602 may cover the entire cover lens (and/or lens assembly 206). In some examples where the display screen(s) 602 covers the entire cover lens (and/or lens assembly 206), the ADF may be omitted. In some examples, a display screen 602 may cover only a portion of the cover lens (and/or lens assembly 206), so as to be visible on only one side (e.g., to only one eye). In some examples, providing the display screen(s) 602 over both sides of the lens assembly 206 (and/or eyes) may make stereoscopic display possible, which may make it possible to display images that appear to have more depth. In some examples, a display screen may be positioned at and/or over a periphery of the lens assembly 206, so as to be less distracting.

In some examples, the display screen(s) 602 may be configured to display simulation stimuli and/or feedback. For example, the display screen(s) 602 may display stimuli simulating effects of the ADF, information regarding welding parameters of the welding equipment 102, and/or feedback regarding welding technique parameters (e.g., contact tip to work distance, travel speed, travel angle, work angle, aim, etc.). In some examples, the display screen(s) 602 may display feedback regarding welding parameters as compared to expected welding parameters. In some examples, the display screen(s) 602 may display feedback regarding target welding technique parameters in the form of one or more (e.g., transparent and/or translucent) target tool images, depicting target positions and/or orientations of the welding-type tool 104. In some examples, feedback may be instead (or additionally) output via other helmet I/O devices 208.

In the examples of FIGS. 2a-2b, the welding helmet 200 includes helmet input/output (I/O) devices 208. In some examples, the helmet I/O devices 208 are devices through which an operator 106 may provide input to, and/or receive output from, the welding helmet 200. In some examples, the I/O devices 208 may include knobs, buttons, levers, switches, touch screens, microphones, speakers, haptic devices, lights (e.g., LEDs), and/or other appropriate I/O devices 208. In some examples, the display screen(s) 602 may be considered part of the helmet I/O devices 208. In some examples, settings of the weld training simulation may be controlled and/or presented to the operator 106 via the helmet I/O devices 208. While shown as being retained on an external surface of the helmet shell 201 in the examples of FIGS. 2a-2b for the purposes of illustration, in some examples, some I/O devices 208 may also be retained on an internal surface of the helmet shell 201.

In the examples of FIGS. 2a-2b, the welding helmet 200 also includes helmet sensors 202. Four helmet sensors 202 are shown as part of the lens assembly 206, while a fifth helmet sensor 202 is shown attached to a rear of the helmet shell 201, separate from the lens assembly 206. In some examples, the welding helmet 200 may include more or fewer helmet sensors 202. In some examples, the four helmet sensors 202 of the lens assembly 206 may be used to track the six degree of freedom (DOF) position and/or orientation of items for the weld training simulation, while the fifth helmet sensor 202 may be used to track the position and/or orientation of the welding helmet 200 itself.

In some examples, the helmet sensors 202 of the welding helmet 200 may be fixed relative to each other, the helmet shell 201, and/or the display screen(s). In some examples, the relative positions of the helmet sensors 202 of the welding helmet 200 may be known, stored, entered manually, and/or automatically detected during a calibration procedure. In some examples, each helmet sensor 202 may comprise one or more camera sensors, optical sensors, infra-red (IR) sensors, thermal sensors, acoustic sensors, ultrasonic sensors, electromagnetic sensors, inertial measurement sensors, accelerometers, gyroscopes, magnetometers, and/or other appropriate types of sensors.

In the examples of FIGS. 2a-2b, the welding helmet 200 further includes helmet circuitry 218 and a helmet power source 216. In some examples, the helmet circuitry 218 and helmet power source 216 may be internal to the helmet shell 202. In some examples, the helmet power source 216 may provide electrical power to the components of the welding helmet 200. In some examples, the power source 216 may comprise one or more batteries, solar panels, and/or energy harvesting devices. In some examples, one or more components of the welding helmet 200 may have a separate power source from which to draw power. In some examples, the helmet circuitry 218 may support, drive, and/or facilitate operation of the welding helmet 200. In some examples, the power source 216 and/or helmet circuitry 218 may be part of the lens assembly 206.

Figure 3:
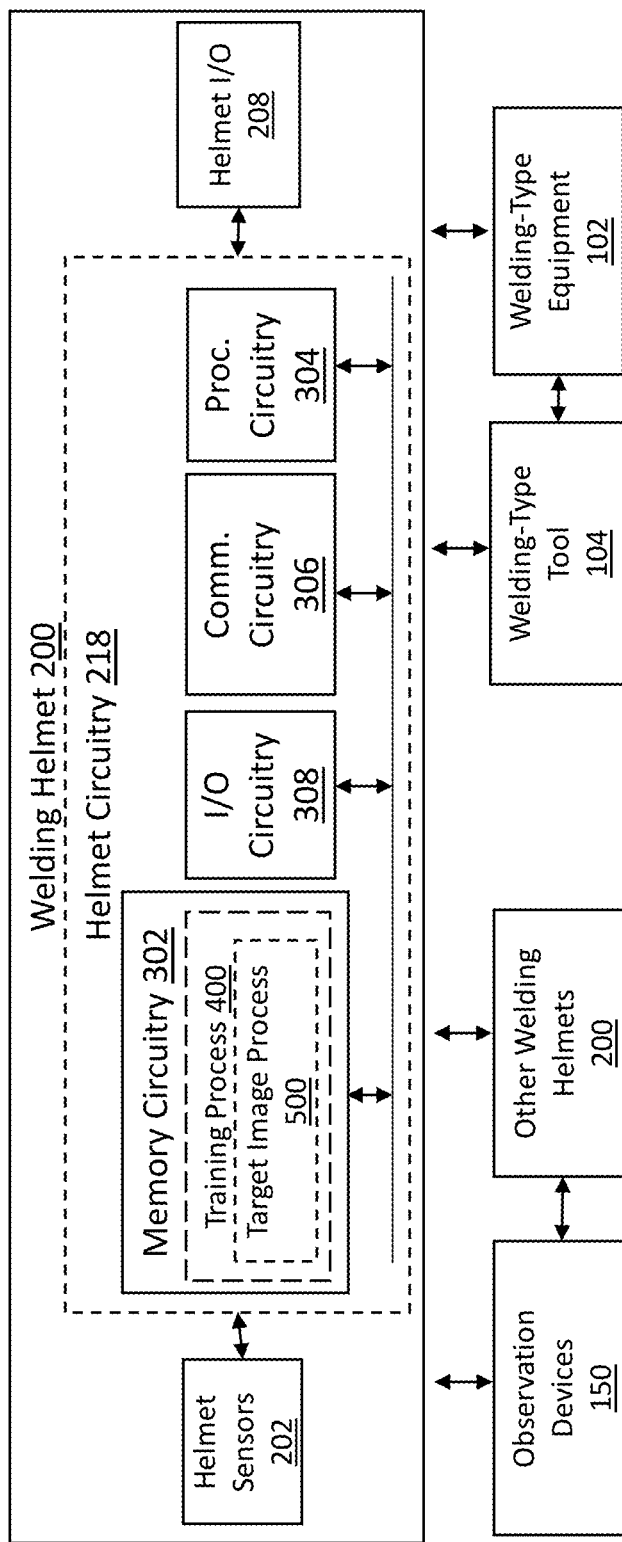
FIG. 3 is a block diagram showing example components and interconnections of the weld training system of FIG. 1, in accordance with aspects of this disclosure.

FIG. 3 is a block diagram showing components and interconnections of the weld training system 100. In particular, FIG. 3 shows more detailed components and interconnections of the welding helmet 200 and helmet circuitry 218. While not shown for the sake of simplicity, the welding helmet 200 may further include power source 216 connected with (and/or providing electrical power to) some or all of the components of the welding helmet 200.

In the example of FIG. 3, the welding helmet 200 is in communication with the welding-type tool 104, the welding equipment 102, one or more other welding helmets 200, and one or more observation devices 150. In some examples, each observation device 150 may have components similar to that of the welding helmet 200 (e.g., sensors, I/O devices, circuitry, power, etc.). In some examples, each observation device 150 may have a structure similar (or identical) to that which is disclosed in U.S. patent application Ser. No. 17/209,755, filed Mar. 23, 2021, entitled "Welding Simulation Systems with Observation Devices," which is hereby incorporated by reference in its entirety.

In the example of FIG. 3, the welding helmet 200 includes one or more helmet sensors 202, helmet I/O devices 208, and helmet circuitry 218. As shown, the helmet circuitry 218 includes helmet memory circuitry 302, helmet processing circuitry 304, helmet communication circuitry 306, and helmet I/O circuitry 308 interconnected with one another via a common electrical bus.

In some examples, the helmet I/O circuitry 308 may comprise one or more drivers for the helmet I/O devices 208. In some examples, the helmet I/O circuitry 308 may be configured to generate one or more signals representative of input received via the helmet I/O device(s) 208, and provide the signal(s) to the bus. In some examples, the helmet I/O circuitry 308 may also be configured to control the helmet I/O device(s) 208 to generate one or more outputs in response to one or more signals (e.g., received via the bus).

In some examples, the helmet communication circuitry 306 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the helmet communication circuitry 306 may be configured to facilitate communication via one or more wired media and/or protocols (e.g., Ethernet cable(s), universal serial bus cable(s), etc.) and/or wireless mediums and/or protocols (e.g., cellular communication, general packet radio service (GPRS), near field communication (NFC), ultra high frequency radio waves (commonly known as Bluetooth), IEEE 802.11x, Zigbee, HART, LTE, Z-Wave, WirelessHD, WiGig, etc.). In some examples, the helmet communication circuitry 306 may be coupled to one or more antennas to facilitate wireless communication.

In some examples, the helmet communication circuitry 306 may be configured to facilitate communications of the welding helmet 200. In some examples, the helmet communication circuitry 306 may receive one or more signals (e.g., from the welding-type tool 104, welding-type equipment 102, etc.) decode the signal(s), and provide the decoded data to the electrical bus. As another example, the helmet communication circuitry 306 may receive one or more signals from the electrical bus (e.g., representative of one or more inputs received via the helmet I/O circuitry 308) encode the signal(s), and transmit the encoded signal(s) to an external device (e.g., welding-type tool 104, welding-type equipment 102, etc.).

In some examples, the helmet processing circuitry 304 may comprise one or more processors, controllers, and/or graphical processing units (GPUs). In some examples, the helmet processing circuitry 304 may comprise one or more drivers for the helmet sensors 202. In some examples, the helmet processing circuitry 304 may be configured to execute machine readable instructions stored in the helmet memory circuitry 302.

In the example of FIG. 3, the helmet memory circuitry 302 includes (and/or stores) a weld training simulation process 400. As shown, the weld training simulation process 400 includes a target tool image process 500. In some examples, the weld training simulation process 400 and/or target tool image process 500 may comprise machine readable instructions configured for execution by the helmet processing circuitry 304.

In some examples, the weld training simulation process 400 may process sensor data captured by helmet sensors 202 and track the 6 DOF position and/or orientation of the welding-type tool 104, workpiece(s) 108, welding helmet 200, and/or other relevant items using the captured sensor data. In some examples, the weld training simulation process 400 may use the 6 DOF position(s) and/or orientation(s) (e.g., in conjunction with other information) to simulate a welding-type operation, workpiece material, etc. In some examples, the weld training simulation process 400 may use the 6 DOF position(s) and/or orientation(s) (e.g., in conjunction with other information) to determine what simulation stimuli to output, as well as how and/or where to output, in order to effectively guide the operator 106 through the welding-type operation.

In some examples, the weld training simulation process 400 may execute the target tool image (e.g., sub) process 500 to help guide the operator 106 through the welding-type operation. In some examples, the target tool image process 500 may show a "ghost" (e.g., transparent and/or translucent) image of a welding-type tool on the display screen(s) 602 of the welding helmet 200 to indicate target positions and/or orientations for the actual welding-type tool 104. In some examples, the target tool image process 500 may use the 6 DOF position(s) and/or orientation(s) (e.g., in conjunction with other information) to determine how and/or where to output the target tool image, so as to effectively guide the operator 106 through the welding-type operation.

Figure 4:
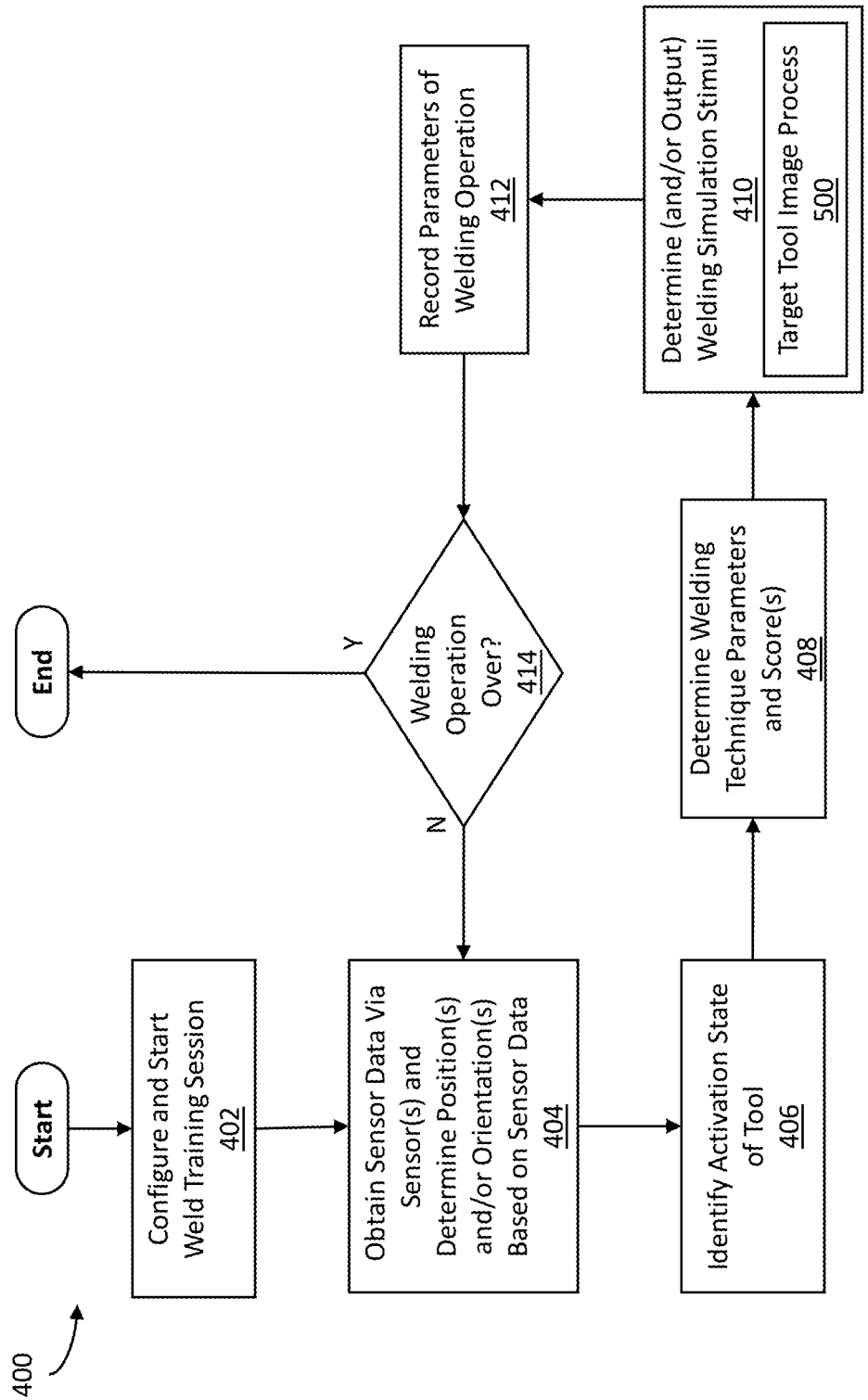
FIG. 4 is a flow diagram illustrating an example operation of a weld training simulation process of the weld training system of FIG. 3, in accordance with aspects of this disclosure.

FIG. 4 is a flowchart illustrating example operation of the weld training simulation process 400 of the welding helmet 200. In some examples, an observation device 150 may operate a modified form of the weld training simulation process 400 and/or coordinate with the weld training simulation process (e.g., as described in U.S. patent application Ser. No. 17/209,755, filed Mar. 23, 2021, entitled "Welding Simulation Systems with Observation Devices").

In the example of FIG. 4, the weld training simulation process 400 begins at block 402, where the weld training simulation process 400 configures a weld training session. In some examples, configuring the weld training session may comprise configuring the welding helmet 200 so it can communicate with the welding-type equipment 102, the welding-type tool 104, other welding helmets 200, and/or one or more observation devices 150.

In some examples, configuring the weld training session may comprise configuring welding parameters. In some examples, configuring the weld training session may comprise the welding helmet 200 receiving the welding parameters from the welding-type equipment 102. In some examples, configuring the weld training session may comprise calibrating the welding helmet 200, such as, for example, calibrating the spatial relationship between the helmet sensors 202, and/or between the helmet sensors 202 and the display screen(s) 602 of the welding helmet 200.

In some examples, configuring the weld training session may comprise one or more selections. For example, selecting a (e.g., type of) weld training exercise, a (e.g., type of) welding-type operation, a (e.g., type of) welding-type tool 104, a (e.g., type of) the welding-type equipment 102, one or more (e.g., types of) markers 114, one or more weld training session parameters, desired feedback, and/or desired stimuli. In some examples, configuring the weld training session may comprise selecting whether live or mock welding-type operations will be conducted.

In some examples, an operator 106 may provide one or more inputs (e.g., via the helmet I/O device(s) 208) to configure the weld training simulation process 400. In some examples, the welding helmet 200 may synchronize and/or communicate with one or more observation devices 150 and/or other welding helmets 200 to configure the weld training simulation process 400 at block 402. In some examples, the weld training simulation process 400 may store the configuration data in helmet memory circuitry 302.

After the configurations are complete, the weld training simulation process 400 may begin a weld training session. In some examples, the weld training session may begin in response to an input from an operator 106 (e.g., via the helmet I/O device(s) 208). In some examples, the weld training session may begin in response to one or more signals received from the welding-type tool 104, welding-type equipment 102, observation device(s) 150, and/or one or more other welding simulators 300. In some examples, the weld training simulation process 400 may send one or more signals to other welding helmets 200 and/or observation devices 150 indicating when the weld training session has started.

In the example of FIG. 4, the weld training simulation process 400 proceeds to block 404 after block 402. At block 404, the weld training simulation process 400 obtains sensor data from the perspective of the welding helmet 200 via the helmet sensor(s) 202 of the welding helmet 200. Using the sensor data, the weld training simulation process 400 determines the position(s) and/or orientation(s) of items tracked by the weld training simulation process 400 (e.g., the welding-type tool 104, workpiece(s) 108, arc, etc.) in 6 DOF (e.g., x, y, z coordinates and yaw, pitch, roll angles). In some examples, the weld training simulation process 400 may also obtain sensor data from the perspective of an observation device 150 and/or another welding helmet 200 in order to appropriately provide renderings from those perspectives (e.g., as further described in U.S. patent application Ser. No. 17/209,755, filed Mar. 23, 2021, entitled "Welding Simulation Systems with Observation Devices").

In the example of FIG. 4, the weld training simulation process 400 proceeds to block 406 after block 404. At block 406, the weld training simulation process 400 identifies an activation state of the welding-type tool 104. In some examples, the weld training simulation process 400 may determine the activation state based on sensor data. For example, one or more markers 114 on the welding-type tool 104 may change state (e.g., from invisible to visible, lit to unlit, static to blinking, blinking at a first frequency to blinking at a second frequency, etc.) when the welding-type tool 104 is activated.

In some examples, the weld training simulation process 400 may determine the activation state based on position/orientation information. For example, the weld training simulation process 400 may conclude that the welding-type tool 104 is activated if the welding-type tool 104 (and/or a nozzle, contact tip, etc. of the welding-type tool 104) is within a threshold distance of a workpiece 108. In some examples, the weld training simulation process 400 may determine the activation state of the welding-type tool 104 based on one or more signals received from the welding-type tool 104, the welding-type equipment 102, and/or another welding helmet 200. For example, the welding-type tool 104 may send one or more signals to the welding-type equipment 102 when the welding-type tool is activated (and/or deactivated), and the welding-type equipment 102 may send one or more (identical or different) signals to the welding helmet 200. As another example, the welding-type tool 104 may send the one or more signals directly to the welding helmet 200. As another example, another welding helmet 200 that has determined the activation state may send one or more signals representative of the activation state.

In some examples, the weld training simulation process 400 may use configuration information from block 402 (e.g., type(s) of welding-type tool 104 and/or marker(s) 114) to determine the activation state. For examples, the weld training simulation process 400 may expect to receive an activation signal from the welding-type tool 104 for certain configurations, and expect to receive an activation signal from the welding-type equipment 102 for other configurations. In some examples, the weld training simulation process 400 may expect to determine activation state purely from position/orientation information in certain other configurations.

In the example of FIG. 4, the weld training simulation process 400 proceeds to block 408 after block 406. At block 408, the weld training simulation process 400 determines (and/or outputs) one or more welding technique parameters. In some examples, the weld training simulation process 400 may determine the welding technique parameters based on configuration data, sensor data, position and/or orientation information, and/or the activation state of the welding-type tool 104. In some examples, welding technique parameters may be further determined based on sensor data, and/or position/orientation data relating to other objects tracked by the weld training simulation process 400. In some examples, the weld training simulation process 400 may determine a weld training score for the operator 106 based on how closely one or more of the welding technique parameters (and/or other welding parameters) match one or more expected welding technique parameters (and/or other welding parameters).

In some examples, the welding technique parameters may include one or more weld bead/path characteristics, such as, for example, a length, straightness, weave, whip, and/or position of the weld bead/path, and/or a distance between weld beads/paths. In some examples, data relating to the movement (and/or activation) of the welding-type tool 104 along the weld path and/or joint may be evaluated to determine the weld bead/path characteristics.

In the example of FIG. 4, the weld training simulation process 400 proceeds to block 410 after block 408. At block 410, the weld training simulation process 400 generates simulation stimuli. In some examples, the simulation stimuli may include visual, audio, and/or haptic stimuli. For example, the simulation stimuli may simulate the sight, sound, and/or feel of an ADF, a welding-type tool 104, workpiece 108 (e.g., material), welding arc, weld puddle, weld bead, and/or welding fumes. In some examples, simulation stimuli may indicate welding parameter information, welding technique parameter information, score information, and/or feedback as to how to adjust and/or improve welding parameters and/or welding technique parameters. In some examples, simulation stimuli may be output via the helmet I/O devices 208.

In the example of FIG. 4, the target tool image process 500 is shown as part of block 410 of the weld training simulation process 400. In some examples, the target tool image process 500 may execute as part of block 410. In some examples, the target tool image process 500 may provide a specific form of stimuli and/or feedback as part of block 410. In particular, the target tool image process 500 may show target tool images 604 on the display screen(s) 602 of the welding helmet 200 to indicate target positions and/or orientations for the actual welding-type tool 104 and help the operator 106 (see, e.g., FIGS. 6a-6d). The target tool image process 500 executed at block 410 is discussed in detail further below.

In the example of FIG. 4, the weld training simulation process 400 proceeds to block 412 after block 410. At block 412, the weld training simulation process 400 records details (e.g., technique parameters, welding parameters, 6 DOF position/orientation data) of the weld training session so far. In some examples, the details may be saved in helmet memory circuitry 302, and/or stored in cache until the end of the welding-type operation then saved in helmet memory circuitry 302. In some examples, these details may be used at a later date by the target tool image process 500 to create and/or control the target tool images 604.

In the example of FIG. 4, the weld training simulation process 400 proceeds to block 414 after block 412. At block 414, the weld training simulation process 400 determines whether the present welding-type operation (and/or training session) is over. In some examples, the determination may be made based on one or more inputs received (or not received) via the helmet I/O devices 208 and/or helmet communication circuitry 306. As shown, the weld training simulation process 400 returns to block 404 if the weld training simulation process 400 determines that the present welding-type operation (and/or training simulation) is not over. The weld training simulation process 400 ends after block 414 if the weld training simulation process 400 determines that the present welding-type operation (and/or training session) is over (though, in some examples, the weld training simulation process 400 may instead return to block 402). In some examples, the weld training simulation process 400 may communicate the determination at block 414 to synched observation devices 150 and/or welding helmets 200.

Figure 5:
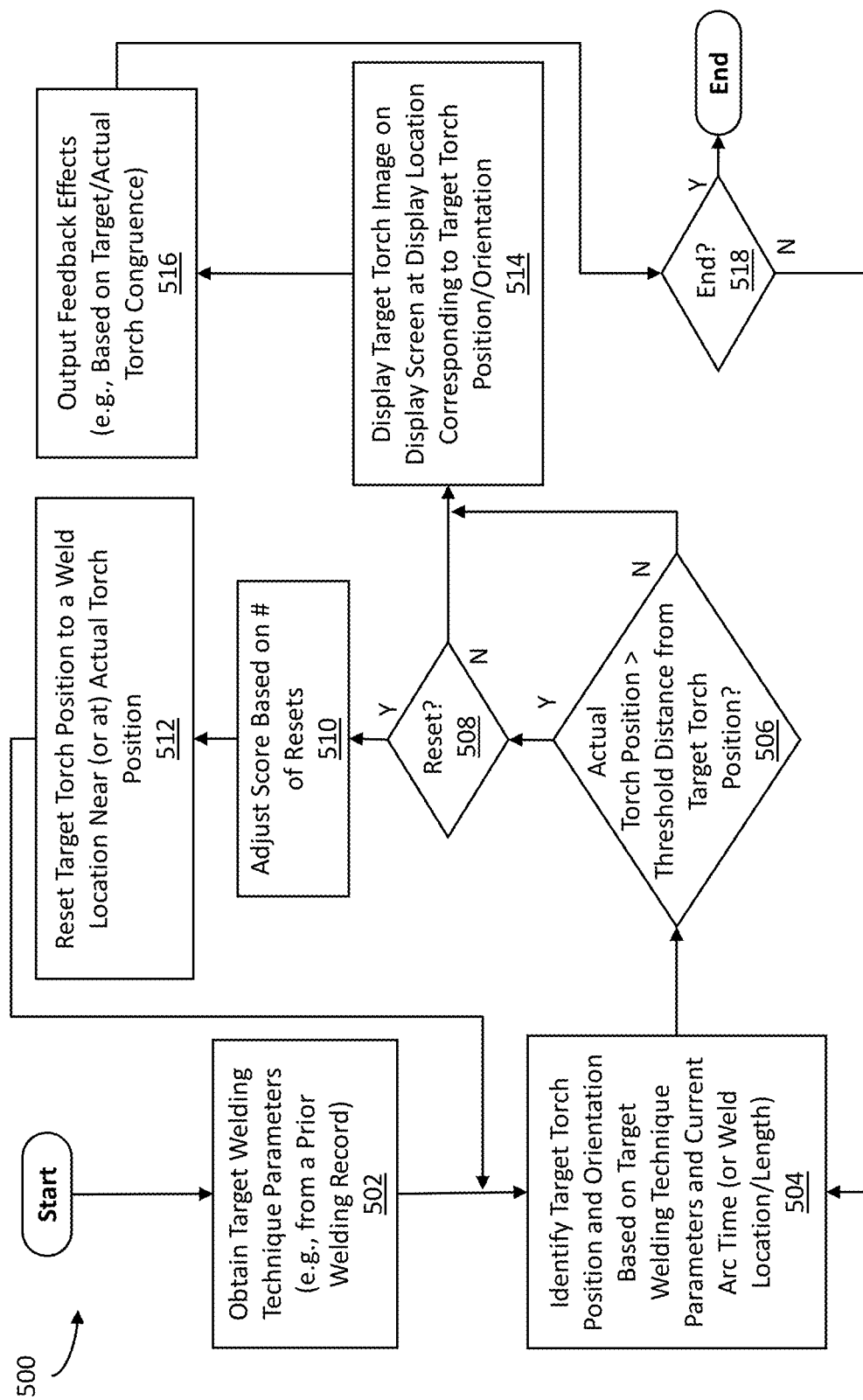
FIG. 5 is a flow diagram illustrating an example operation of a target tool image process of the weld training simulation process of FIG. 4, in accordance with aspects of this disclosure.

FIG. 5 is a flowchart illustrating example operation of the target tool image process 500. In some examples, the target tool image process 500 may provide a specific form of stimuli and/or feedback to help guide an operator 106. In particular, the target tool image process 500 may show a (e.g., transparent and/or translucent) target tool image 604 to indicate target positions and/or orientations for the actual welding-type tool 104 (see, e.g., FIGS. 6a-6d). In some examples, the target tool images 604 may be shown on the display screen(s) 602 of the welding helmet 200 and/or other headgear, so that a user wearing the helmet/headgear can easily see the target tool image 604 in relation to the actual welding-type tool 104 they are holding. In this way, a new welding operator 106 may be trained on proper welding technique without requiring an experienced operator to be present for live instruction.

In some examples, the target tool image process 500 may additionally "reset" (or provide an option to reset) the target tool image 604 to an earlier/later (and/or prior/subsequent) position if it gets too far away from the actual position of the welding-type tool 104. This may help in situations where the travel speed of the target tool image 604 substantially outpaces the travel speed of the actual welding-type tool 104 (or vice versa), and the resulting distance makes differences between the relative orientations more difficult to discern. Additionally, resetting the target tool image 604 to a position closer to the welding-type tool 104 may lessen the possibility that the operators 106 will be tempted to drastically increase/decrease their travel speed in order to catch up with the target tool image 604; a practice which may be highly detrimental to the quality of the weld.

In the example of FIG. 5, the target tool image process 500 begins at block 502, where the target tool image process 500 obtains target welding technique parameters (e.g., contact tip to work distance, travel speed, travel angle, work angle, aim, position, orientation, etc.). In some examples, the target welding technique parameters may have been recorded during a prior weld training simulation process 400 (e.g., at block 412). In some examples, the target welding technique parameters may be determined by the target tool image process 500 based on data recorded during a prior weld training simulation process 400. In some examples, the target welding technique parameters may be manually entered (e.g., by an administrator).

In some examples, particular target welding technique parameters may be tied to a particular time (e.g., of a welding-type operation and/or clock) and/or position (e.g., relative to workpiece, weld path, world coordinates, etc.). This might allow the target tool image process 500 to determine, for example, particular target welding technique parameters for x seconds into the welding operation, or for y centimeters along the weld bead/path.

In some examples, the target welding technique parameters may be modified and/or customized at block 502. For example, the target welding technique parameters may be modified and/or customized to start/end at particular position(s)/time(s), which may be useful if the operator 106 only wants guidance for one or more particular portions of the welding operation. As another example, the travel speed may be modified to be slower (e.g., ½ or ¼ speed) or faster (2×, 4×, etc.) than what was originally recorded. In some examples, setting a slower/faster speed may make it easier for a new operator 106 to stay close to the target tool image 604, which has certain advantages, as explained above.

As another example, the target welding technique parameters may be modified and/or customized to have a travel speed that is always equal to the travel speed of the welding-type tool 104. In some examples, this may ensure the target tool image 604 never outpaces the welding-type tool 104, which has certain advantages, as explained above. As another example, the target welding technique parameters may be modified and/or customized to be determined by position rather than time. This may ensure that the target tool image 604 is always shown at the same position along the weld bead/path as the welding-type tool 104, effectively eliminating the risk that the target tool image 604 outpaces the welding-type tool 104.

In some examples, other parameters of the target tool image process 500 may be modified and/or customized at block 502 as well. For example, the look and/or feel of the target tool image 604 itself may be customized (e.g., size, shape, color, effects, etc.). In some examples, the type of tool the target tool image 604 depicts (e.g., in size, shape, etc.) may be customized. In some examples, in the absence of customization, the type of tool the target tool image 604 depicts may default to be the type of tool used by the operator 106, or the type of tool used when the target welding technique parameters were first recorded. While referred to as a target tool image for the sake of simplicity, in some examples, the target tool image 604 may depict a welding consumable (e.g., electrode, filler rod, etc.) as well as, or instead of, a welding-type tool 104. In some examples, the parameters of the target tool image process 500 may be stored in helmet memory circuitry 302.

In the example of FIG. 5, the target tool image process 500 proceeds to block 504 after block 502. At block 504, the target tool image process 500 identifies a position and/or orientation for the target tool image 604. In some examples, the position and/or orientation of the target tool image 604 may be identified/determined based on the sensor data and/or position/orientation data that was obtained and/or determined in the weld training simulation process 400 (e.g., at block 404). In some examples, the position and/or orientation of the target tool image 604 may also be based on the target welding technique parameters. In some examples, the position and/or orientation of the target tool image 604 may be identified/determined relative to the welding helmet 200, the workpiece 108, the welding-type tool 104, and/or some other object.

In some examples, the position and/or orientation of the target tool image 604 may also be based on timing and/or positional information. For example, the position and/or orientation of the target tool image 604 may be based on the amount of time the welding-type tool 104 has been activated (e.g., arc time). As another example, the position and/or orientation of the target tool image 604 may be based on the most recent position of the welding-type tool 104 along the weld path when it was activated. As another example, the position and/or orientation of the target tool image 604 may be based on the length (and/or other profile information) of the weld bead/path that has been produced during the welding operation so far.

In the example of FIG. 5, the target tool image process 500 proceeds to block 506 after block 504. At block 506, the target tool image process 500 determines whether the position of the actual welding-type tool 104 is more than a threshold distance from the position of the target tool image 604. This check may be helpful to make sure that the target tool image 604 does not get too far away from the actual welding-type tool 104, so as to minimize the detrimental impact associated with such a situation. In some examples, the precise value of the threshold distance may be stored in helmet memory circuitry and/or be editable as part of the custom configurations at block 502.

In the example of FIG. 5, the target tool image process 500 proceeds to block 508 after block 506 if the position of the actual welding-type tool 104 is more than a threshold distance from the position of the target tool image 604. At block 508, the target tool image process 500 determines whether to reset the target tool image 604 to an earlier/later time and/or position that is closer to the position of the actual welding-type tool 104. In some examples, this determination may involve notifying the operator 106 (or an administrator) of the disparity in positions and/or prompting for a decision whether to reset. In some examples, the target tool image process 500 may be configured (e.g., at block 502) to default to reset (or not reset) in the absence of response to the reset prompt.

In the example of FIG. 5, the target tool image process 500 proceeds to block 510 after block 508 if the target tool image process 500 determines to reset (e.g., based on a received input or default) the target tool image 604 to an earlier time and/or position closer to the welding-type tool 104. In some examples, the target tool image process 500 may provide an output (e.g., via the helmet I/O device(s) 208) notifying the operator 106 of the reset before and/or after the reset occurs. At block 510, the target tool image process 500 adjusts the score(s) of the weld training simulation based on the reset. In some examples, this may serve as a way to account for the negative scoring impact of failing to match the target position of the target tool image 604 if no reset were available. In some examples, the score(s) may be negatively impacted each time there is a reset, such as by a decrease of a portion (e.g., one third/half/full) of a letter grade or a portion (e.g., 5%, 10%, 15%, etc.) of a numerical score. In some examples, the negative impact may increase (e.g., from −5% to −15%) each reset, every other reset, or after a certain number of resets.

In the example of FIG. 5, the target tool image process 500 proceeds to block 512 after block 510. At block 512, the target tool image process 500 modifies its configuration (and/or the target welding technique parameters) to reset the target tool image 604. For example, the target tool image process 500 may revert the target tool image 604 to an earlier position along the weld bead/path. As another example, the target tool image process 500 may revert the target tool image 604 to a position (and/or other target welding technique parameters) corresponding to an earlier (e.g., arc) time. In some examples, the target tool image process 500 may revert the target tool image 604 to a time or position that would place the target tool image 604 closest to the position of the welding-type tool 104. In some examples, the target tool image process 500 may revert the target tool image 604 to a time or position that would place the target tool image 604 closest to a point a threshold distance away from the welding-type tool 104.

In some examples, the target tool image process 500 may further adjust the travel speed of the target tool image 604 at block 512. This may help the operator 106 better keep up with the target tool image 604. In some examples, the target tool image process 500 may reduce the travel speed of the target tool image 604 (e.g., by some fraction and/or percentage). In some examples, the target tool image process 500 may set the travel speed of the target tool image 604 to match that of the welding-type tool 104. In some examples, the target tool image process 500 may keep track of the number of resets, progressively decrease the travel speed (e.g., from ¾ speed, to ½ speed, to ⅓ speed, etc.) for each reset, up to a threshold number of resets, at which point the travel speed of the target tool image 604 is set to match that of the welding-type tool 104. In some examples, the threshold number of resets, the speed decrease progression, and/or the placement of the target tool image 604 at reset may be set as part of the configuration of block 502.

In the example of FIG. 5, the target tool image process 500 returns to block 504 after block 502. As shown, the target tool image process 500 proceeds to block 514 after block 508 if the target tool image process 500 decides not to reset the target tool image 604. As shown, the target tool image process 500 also proceeds to block 514 after block 506 if the position of the actual welding-type tool 104 is not more than a threshold distance from the position of the target tool image 604.

At block 506, the target tool image process 500 displays the target tool image 604 on the display screen(s) 602 of the welding helmet 200 (as shown, for example, in FIGS. 6a-6d). In some examples, the target tool image process 500 may determine a display location for the target tool image 604 on the display(s) 602 of the welding helmet 200 prior to display at block 514. In some examples, the determination of the display location may involve a translation based on the sensor data and/or position/orientation data relating to the welding helmet 200 (from block 404). For example, the target tool image process 500 may use the known position and/or orientation of the target tool image 604 relative to the workpiece 108, and the known position and/or orientation of the welding helmet 200 (and/or its display screen(s)) relative to the workpiece 108, and translate this information into an appropriate display location for the target tool image 604. In some examples, the target tool image process 500 may also determine a display location for, and/or display, a target weld bead 606 (and/or weld path), using the same (or a similar) process (see, e.g., FIGS. 6a-6d).

In the example of FIG. 5, the target tool image process 500 proceeds to block 516 after block 514. At block 516, the target tool image process 500 outputs one or more additional feedback effects (and/or simulation stimuli) if the actual welding technique parameters (e.g., determined at block 408) are the same as (or within a threshold of) the target welding technique parameters. In some examples, the target tool image process 500 may output a different effect for each congruent actual/target welding technique parameter. In some examples, the target tool image process 500 may only output an effect if a certain number (or all) of the actual welding technique parameters are the same as (or within a threshold of) the target welding technique parameters. In some examples, one or more additional images may also be output (e.g., a smiling emoji, a check mark, fireworks, etc.).

In some examples, the additional feedback effects may indicate to the operator 106 that they are properly positioning and/or orienting the welding-type tool 104. In some examples, the effects may include a darkening, emboldening, and/or highlighting of the (e.g., outline of the) target tool image 604. For example, the (e.g., outline of the) target tool image 604 may change color (e.g., to green) or become animated (e.g., pulsing). As another example, the target tool image process 500 may change the (e.g., outline of the) target tool image 604 to one color (e.g., green) when the actual/target welding technique parameters are the same (or within a threshold), change to a second color (e.g., yellow) when the actual/target welding technique parameters are different (e.g., by more than the threshold), and/or change to a third color (e.g., red) when the actual/target welding technique parameters are very different (e.g., by more than second threshold). In some examples, the target tool image process 500 may change the transparency and/or darkness of the target tool image 604 in addition (or as an alternative) to the color, so that the target tool image 604 appears to fade away as it gets farther (e.g., more than a $1^{st}$, $2^{nd}$, $3^{rd}$, etc. threshold) away from the actual welding-type tool 104. In some examples, the thresholds discussed above with respect to block 516 may be set and/or configured as part of block 502.

In the example of FIG. 5, the target tool image process 500 proceeds to block 518 after block 516. At block 518, the target tool image process 500 determines whether it should end or not. In some examples, this determination may coordinate with the determination at block 414 of the weld training simulation process 400. As shown, the target tool image process 500 ends if the target tool image process 500 determines it should end, and otherwise proceeds back to block 504 if the target tool image process 500 determines it should not end.

FIGS. 6a-6d illustrate example depictions of a target tool image 604 on a display screen 602 of the welding helmet 200. Also shown are depictions of an actual welding-type tool 104, a target weld bead 606, an actual weld bead 608, a workpiece 108, and two examples of scores 614. The target weld bead 606 is shown as a transparent outline along the joint of the workpiece 108. The target tool image 604 is shown as a transparent outline in the same shape as the welding-type tool 104.

In some (e.g., live-weld) examples, the workpiece 108 and/or welding-type tool 104 seen in FIGS. 6a-6d may be unaltered images of a real live welding-type tool 104 and/or workpiece 108 seen through the display screen 602, or captured from a helmet (e.g., camera) sensor 202 and displayed on the display screen 602. In some (e.g., simulated weld) examples, the welding-type tool 104 and/or workpiece 108 may be enhanced and/or altered when displayed on (or seen through) the display screen 602, so as to lend credibility to the simulation.

Figure 6A:
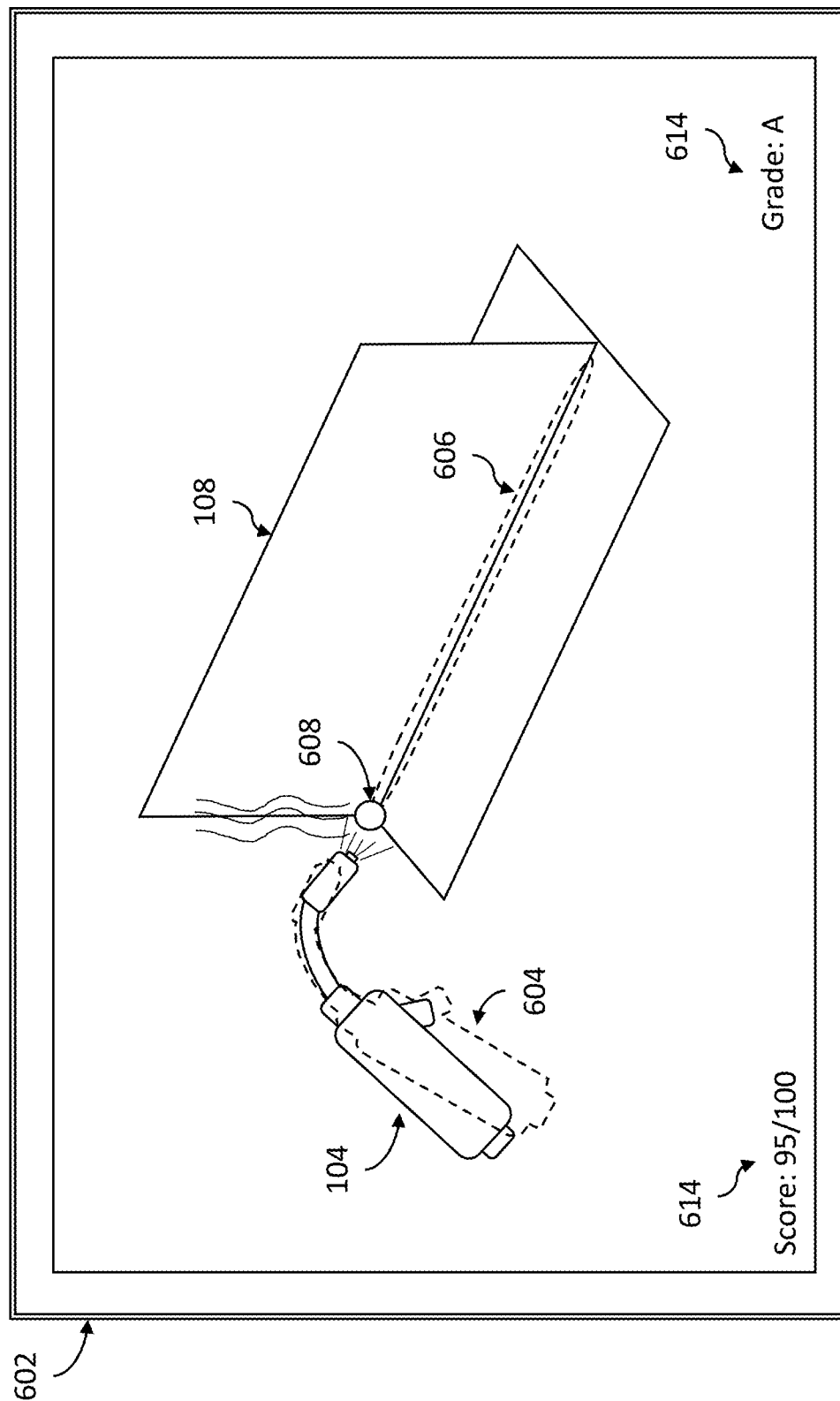
FIGS. 6a-6d show various examples of a display screen of the welding helmet of FIGS. 2a-2b during the target tool image process of FIG. 5, in accordance with aspects of this disclosure.

In the example of FIG. 6a, the welding operation is just beginning. The welding-type tool 104 is shown just beginning to weld at the start of the target weld bead 606. As shown, the target tool image 604 is at the same position as the actual welding-type tool 104 (since this is the beginning). However, the target tool image 604 has a different orientation than the welding-type tool 104, which results in different target/actual technique parameters (e.g., travel angle, work angle, aim, contact tip to work distance, etc.). As shown, the scores 614 have been impacted by the difference in orientation by decreasing slightly from the 100% and/or A+ starting point.

Figure 6B:
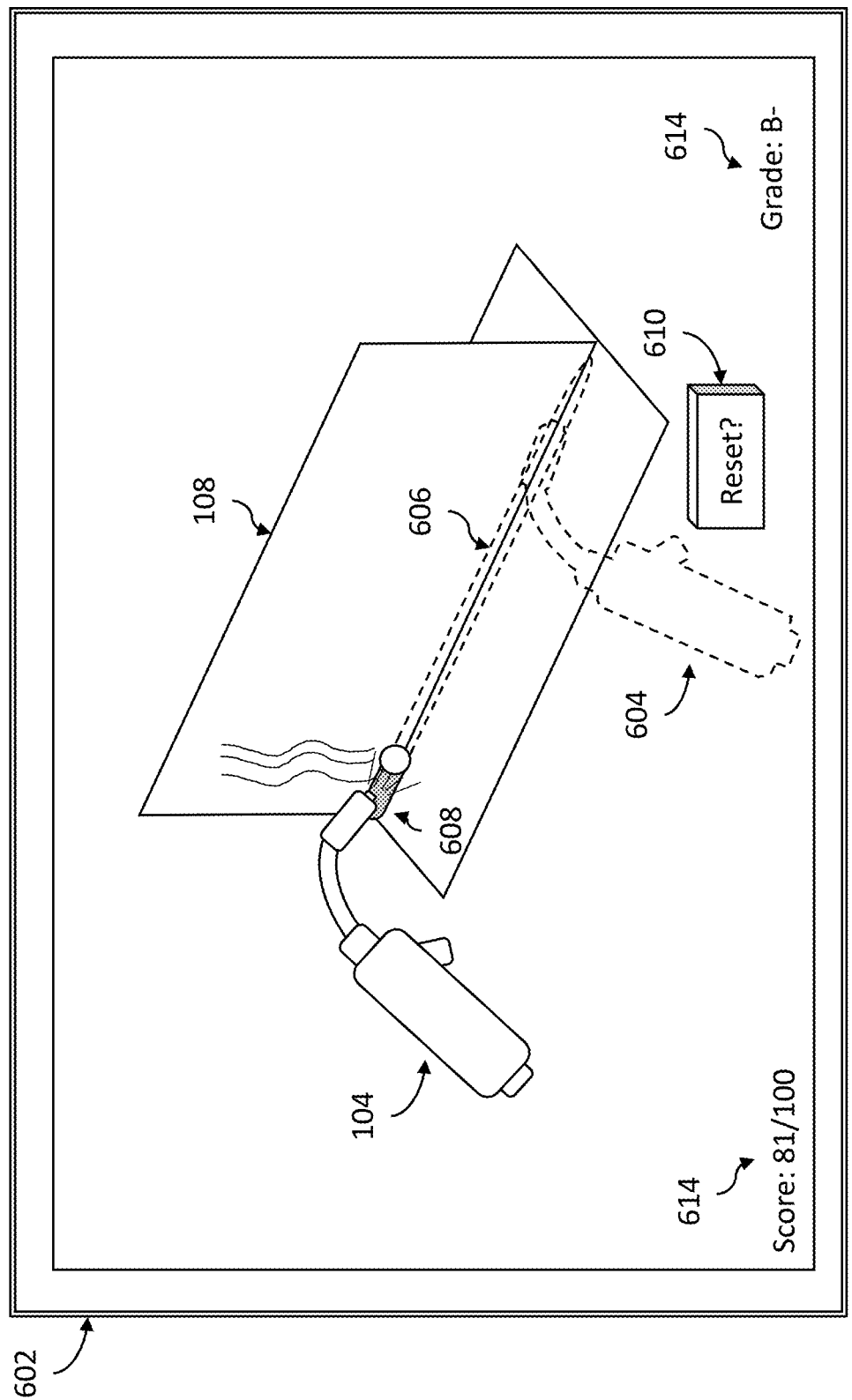

In the example of FIG. 6b, the welding operation has progressed a bit from the beginning shown in FIG. 6a. As shown, the welding-type tool 104 has moved farther along the target weld bead 606 from the start. However, the target tool image 604 has moved much farther than the welding-type tool 104, to almost the end of the target weld bead 606.

With the positions of the target tool image 604 and the actual welding-type tool 104 so incongruent and/or out of synch, it is difficult to tell whether the orientations are also incongruent and/or out of synch, and thus less useful as a guidance mechanism. As shown, the scores 614 have also been negatively impacted by the incongruity. Indeed, the positions are so different that the operator 106 has been presented with a reset option 610 (e.g., block 508), which the operator 106 may be able to select using voice or a special input on the welding-type tool 104 itself, to avoid interrupting the welding operation.

Figure 6C:
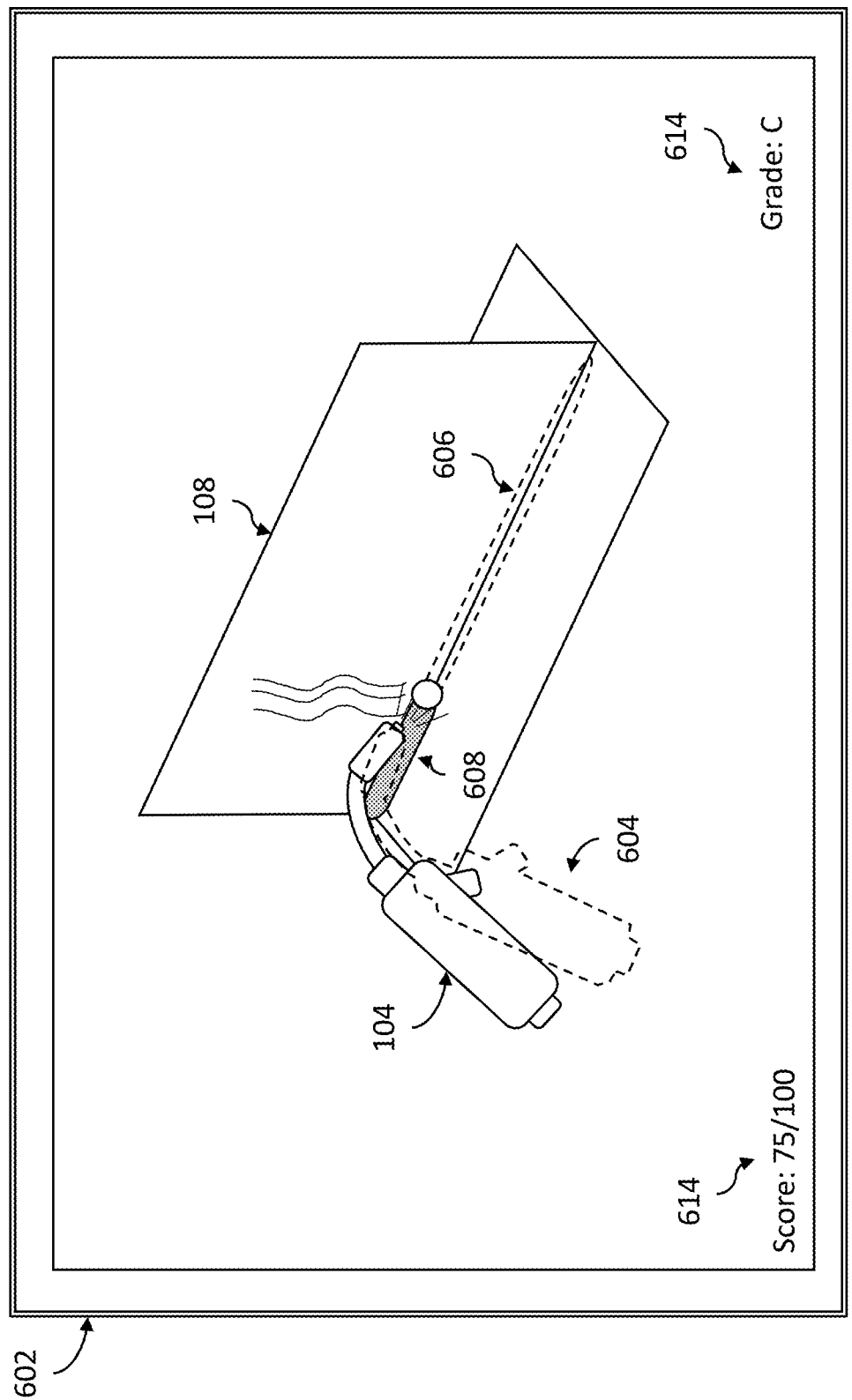

In the example of FIG. 6c, the welding operation has progressed a little more from FIG. 6b, and the target tool image 604 has been reset to the position of the actual welding-type tool 104. As shown, the scores 614 have been negatively impacted from the reset of the target tool image 604. Nevertheless, with the two positions closer together, it is easier to tell that the orientation of the actual welding-type tool 104 is different than that of the target tool image 604.

Figure 6D:
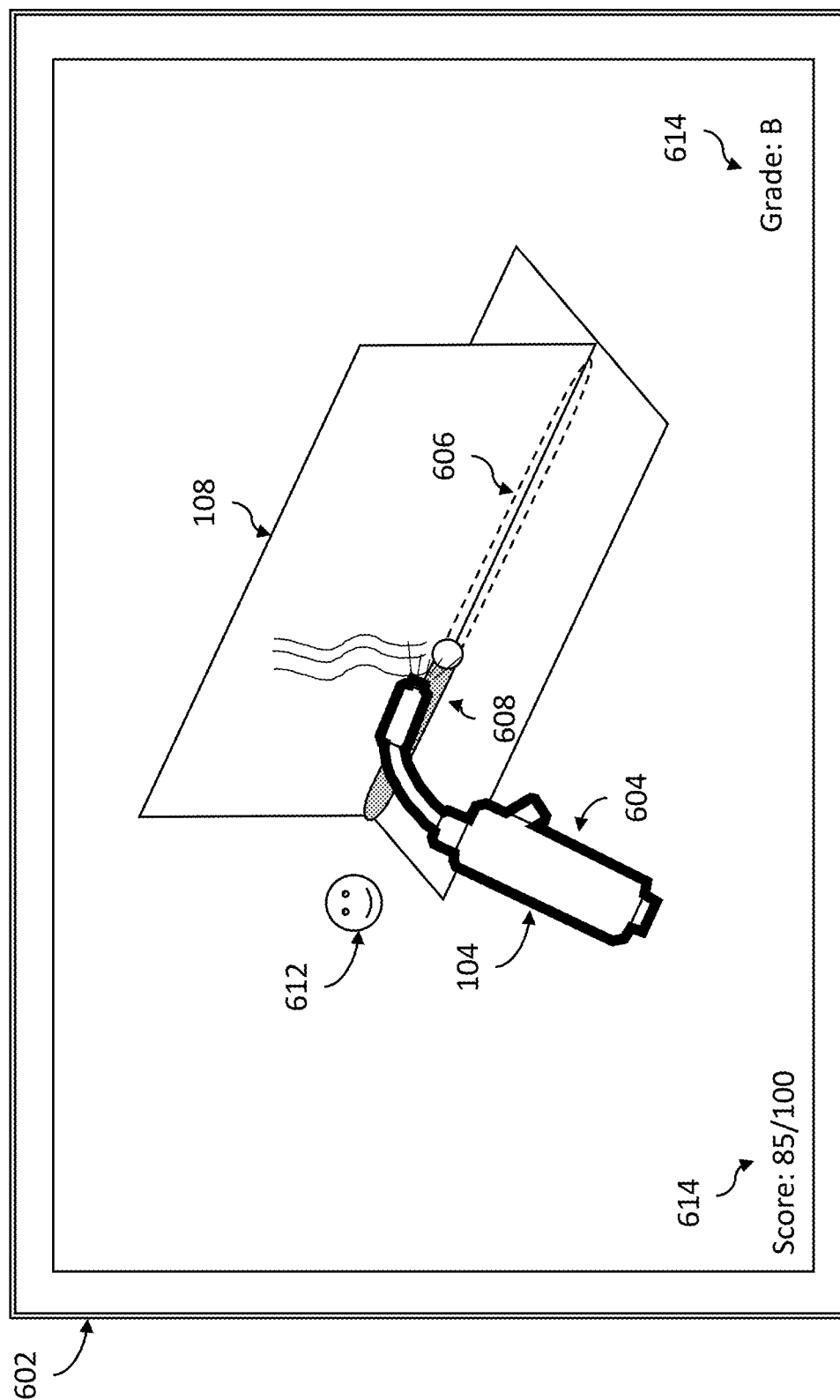

In the example of FIG. 6d, the welding operation has progressed a little more from FIG. 6c, and the operator 106 has managed to match the position and orientation of the welding-type tool 104 with the target tool image 604. As shown, the outline of the target tool image 604 has been emboldened via an additional feedback effect (e.g., block 516) to let the operator 106 know that the positions/orientations of the welding-type tool 104 and target tool image 604 are congruent and/or synchronized. An additional smiley face emoji 612 is also shown to emphasize the positivity of the congruency and/or synchronization, and the scores 614 have been similarly positively impacted. In some examples, there may be a further effect that shows the precise impact on the score (e.g., +10).

The ability of the target tool image process 500 to reset the position of the target tool image 604 to a position closer to the actual welding-type tool 104 may help in minimizing the risk that an operator 106 will overcompensate to try and catch up with the target tool image 604; a practice which may be highly detrimental to the quality of the weld. Additionally, resetting the target tool image 604 to a position closer to the welding-type tool 104 may allow an operator 106 to better perceive and/or understand differences in orientation and/or other technique parameters. While a reset may have a negative impact on score, the reset may also increase the chance the operator 106 will be able to thereafter synchronize the welding-type tool 104 with the target tool image 604, which may have a positive impact on score.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

What is claimed is:

1. A non-transitory machine readable medium comprising machine readable instructions which, when executed by a processor, cause the processor to:
   determine a first target position and a first target orientation for a target tool image based on one or more target welding technique parameters;
   identify an actual position and an actual orientation of a welding tool based on sensor data received from a sensor of a welding headgear;
   compare the actual position of the welding tool with the first target position of the target tool image; and
   in response to determining the first target position of the target tool image is more than a threshold distance from the actual position of the welding tool: reset, or provide an option to reset, the first target position of the target tool image to a second target position that is closer to the actual position of the welding tool.

2. The non-transitory machine readable medium of claim 1, further comprising machine readable instructions which, when executed by the processor, cause the processor to display the target tool image on a display screen of the welding headgear based on the first target position or the second target position.

3. The non-transitory machine readable medium of claim 2, further comprising machine readable instructions which, when executed by the processor, cause the processor to display a movement of the target tool image on the display screen at a travel speed that corresponds to an actual travel speed of the welding tool.

4. The non-transitory machine readable medium of claim 1, further comprising machine readable instructions which, when executed by the processor, cause the processor to negatively adjust a welding score in response to the first target position being reset.

5. The non-transitory machine readable medium of claim 4, wherein the welding score is determined based on a difference between the first target orientation of the target tool image and the actual orientation of the welding tool, as well as a number of times the first target position of the target tool image was reset.

6. The non-transitory machine readable medium of claim 1, wherein the one or more target welding technique parameters were recorded during a previous welding operation.

7. The non-transitory machine readable medium of claim 6, wherein the second target position of the target tool image corresponds to a position that was recorded during the previous welding operation.

8. A welding headgear, comprising:
   a display screen;
   a sensor configured to detect sensor data relating to a welding tool; and
   processing circuitry configured to:
      identify a length of a weld bead;
      determine a first target position and a first target orientation for a target tool image based on the length of the weld bead and one or more target welding technique parameters recorded during a previous welding operation,
      identify an actual position and an actual orientation of the welding tool based on the sensor data,
      compare the actual position of the welding tool with the first target position of the target tool image, and
      in response to determining the first target position of the target tool image is more than a threshold distance from the actual position of the welding tool: reset, or provide an option to reset, the first target position of the target tool image to a second target position that is closer to the actual position of the welding tool,
      the second target position of the target tool image corresponding to a position of a previous welding tool that was recorded during the previous welding operation when a previous weld bead was of a same length as the length of the weld bead.

9. The welding headgear of claim 8, wherein the one or more target welding technique parameters comprise one or more of a torch position, torch orientation, torch travel speed, torch travel direction, torch travel angle, work angle, contact tip to work distance, torch aim, or weld path characteristic.

10. The welding headgear of claim 8, wherein the processing circuitry is further configured to negatively adjust a welding score in response to the first target position being reset.

11. The welding headgear of claim 8, further comprising a helmet shell, the display screen, sensor, and processing circuitry being retained by the helmet shell.

12. The welding headgear of claim 8, wherein the sensor comprises a camera sensor, optical sensor, infra-red (IR) sensor, thermal sensor, acoustic sensor, ultrasonic sensor, or electromagnetic sensor.

13. The welding headgear of claim 8, wherein the target tool image comprises an outline, transparent depiction, translucent depiction, or semi-transparent depiction of the welding tool, a different welding tool, or a welding consumable.

14. The welding headgear of claim 8, wherein the processing circuitry is further configured to:
   compare the actual position and actual orientation of the welding tool with the first target position and first target orientation of the target tool image, and
   in response to determining the actual position and actual orientation of the welding tool match the first target position and first target orientation of the target tool image, providing an effect that affirms that the welding tool is properly positioned and oriented.

15. A method of guiding a welding operator, comprising:
   determining, via processing circuitry of a welding headgear, a first target position and a first target orientation for a target tool image based on one or more target welding technique parameters;
   identifying an actual position and an actual orientation of a welding tool based on sensor data received from a sensor of the welding headgear;
   comparing the actual position of the welding tool with the first target position of the target tool image;
   in response to determining the first target position of the target tool image is more than a threshold distance from the actual position of the welding tool: resetting, or providing an option to reset, the first target position of the target tool image to a second target position that is closer to the actual position of the welding tool;
   displaying the target tool image on a display screen of the welding headgear based on the first target position or second target position;
   negatively adjusting a welding score in response to the first target tool position being reset; and
   displaying the welding score on the display screen.

16. The method of claim 15, wherein the sensor comprises a camera sensor, optical sensor, infra-red (IR) sensor, thermal sensor, acoustic sensor, ultrasonic sensor, or electromagnetic sensor.

17. The method of claim 15, wherein the target tool image comprises an outline, transparent depiction, translucent depiction, or semi-transparent depiction of the welding tool, a different welding tool, or a welding consumable.

18. The method of claim 15, further comprising displaying a movement of the target tool image on the display screen at a travel speed that corresponds to an actual travel speed of the welding tool.

19. The method of claim 15, wherein: the one or more target welding technique parameters comprise one or more of a torch position, torch orientation, torch travel speed, torch travel direction, torch travel angle, work angle, contact tip to work distance, torch aim, or weld path characteristic.

20. The method of claim 15, further comprising:
   comparing the actual position and actual orientation of the welding tool with the first target position and first target orientation of the target tool image; and
   in response to determining the actual position and actual orientation of the welding tool match the first target position and first target orientation of the target tool image, providing an effect, via a user interface of the welding headgear, that affirms that the welding tool is properly positioned and oriented.

\* \* \* \* \*